United States Patent
Kuehner

(10) Patent No.: US 12,054,170 B2
(45) Date of Patent: Aug. 6, 2024

(54) DIRECTIONAL STIMULI TO ENHANCE VEHICLE OPERATOR SITUATIONAL AWARENESS

(71) Applicant: TOYOTA RESEARCH INSTITUTE, INC., Los Altos, CA (US)

(72) Inventor: Manuel Ludwig Kuehner, Los Altos, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 279 days.

(21) Appl. No.: 17/177,112

(22) Filed: Feb. 16, 2021

(65) Prior Publication Data

US 2022/0258755 A1 Aug. 18, 2022

(51) Int. Cl.
*B60W 50/14* (2020.01)
*B60W 30/095* (2012.01)

(52) U.S. Cl.
CPC ........ *B60W 50/14* (2013.01); *B60W 30/0956* (2013.01); *B60W 2420/403* (2013.01);
(Continued)

(58) Field of Classification Search
CPC ............ B60W 50/14; B60W 30/0956; B60W 2554/4041; B60W 2540/225; B60W 2754/10; B60W 2420/42; B60W 2420/52
See application file for complete search history.

(56) References Cited

U.S. PATENT DOCUMENTS 8,009,051 B2  8/2011  Omi 8,144,002 B2 * 3/2012 Kiuchi .................. G01B 11/26
340/436
(Continued)

FOREIGN PATENT DOCUMENTS

CN        105365668         3/2016
JP       2018181061 A  *  11/2018
WO    WO-2021205430 A1  *  10/2021

OTHER PUBLICATIONS

John Morrell et al., "Design and evaluation of a vibrotactile seat to improve spatial awareness while driving", IEEE Haptics Symposium 2010, (DOI: 10.1109/HAPTIC.2010.5444642) (Year: 2010).*

(Continued)

*Primary Examiner* — Tarek Elarabi
(74) *Attorney, Agent, or Firm* — SHEPPARD, MULLIN, RICHTER & HAMPTON LLP; Daniel N. Yannuzzi

(57) ABSTRACT

Directional stimuli are applied to a vehicle operator to enhance situational awareness. Characteristics within a vehicle's external environment may be assessed to determine whether they present at least a threshold safety risk. If so, a type and/or intensity of a directional stimulus to apply to the vehicle operator is determined. In addition, one or more output devices is selected to apply the directional stimulus. The selected output devices may, upon activation, apply the directional stimulus from a same direction as the underlying directionality, in relation to the vehicle, of a potential safety hazard present in the vehicle's external environment. In this manner, the applied stimulus elicits an immediate rise in the vehicle operator's situational awareness, and also immediately informs her—based on the direction from which the stimulus is applied/received—of the directionality of the potential safety hazard within the vehicle's external environment.

20 Claims, 5 Drawing Sheets

(52) U.S. Cl.
CPC . *B60W 2420/408* (2024.01); *B60W 2540/225* (2020.02); *B60W 2554/4041* (2020.02); *B60W 2754/10* (2020.02)

(56) References Cited

U.S. PATENT DOCUMENTS

| | | | | |
|---|---|---|---|---|
| 9,545,879 | B2 | 1/2017 | Stebbins | |
| 10,023,204 | B1* | 7/2018 | Kim | G08G 1/167 |
| 10,144,348 | B2* | 12/2018 | Hergeth | B60W 50/14 |
| 10,653,350 | B2 | 5/2020 | Takemoto | |
| 11,345,279 | B2* | 5/2022 | Kopp | B60W 30/08 |
| 2007/0244641 | A1* | 10/2007 | Altan | B60W 50/16 |
| | | | | 701/2 |
| 2009/0243880 | A1* | 10/2009 | Kiuchi | G08G 1/166 |
| | | | | 342/107 |
| 2015/0224988 | A1* | 8/2015 | Buerkle | B60W 30/0956 |
| | | | | 701/45 |
| 2018/0173230 | A1* | 6/2018 | Goldman-Shenhar | |
| | | | | B60W 50/14 |
| 2022/0014865 | A1* | 1/2022 | Teevens | B60K 35/00 |
| 2022/0289223 | A1* | 9/2022 | Zhang | G01S 13/931 |
| 2023/0159046 | A1* | 5/2023 | Aluf | B60W 50/14 |
| | | | | 340/435 |

OTHER PUBLICATIONS

Machine Translation of Hayashi's reference (JP-2018-181061-A) (Year: 2018).*

Humphries, Matthew, "Panasonic Uses AI to Keep Drowsy Drivers Awake," PC Mag, Jul. 31, 2017, found at https://www.pcmag.com/news/panasonic-uses-ai-to-keep-drowsydrivers-awake.

Scutti, Susan, "Got Goosebumps? Why Stress Responses Can Cause Your Hair to Stand On End," Medical Daily, Apr. 9, 2015, found at https://www.medicaldaily.com/gotgoosebumps-why-stress-responses-can-cause-your-hair-stand-end-328544.

Wikipedia web page for "Car seat" found at https://en.wikipedia.org/wiki/Car_seat.

Wikipedia web page for "Dashcam" found at https://en.wikipedia.org/wiki/Dashcam.

* cited by examiner

DIRECTIONAL STIMULI TO ENHANCE VEHICLE OPERATOR SITUATIONAL AWARENESS

TECHNICAL FIELD

The disclosed technology relates generally to directional stimuli to enhance vehicle operator situational awareness, and in some implementations, more particularly to directing stimuli to particular areas on a vehicle operator's body from particular directions that are indicative of a directionality associated with potential safety hazards in the external environment.

DESCRIPTION OF RELATED ART

There exist various vehicle systems adapted to increase a situational awareness of a vehicle operator. Situational awareness of a vehicle operator may refer to the operator's level of alertness or attentiveness during vehicle operation, and in particular, the extent to which the operator is aware of objects, events, hazards, or the like inside and/or external to the vehicle, at least some of which may pose a potential safety risk. Such vehicle systems generally utilize audible and/or visual cues to enhance the vehicle operator's situational awareness. Some vehicle systems provide haptic feedback to the user such as vibrating a steering wheel to indicate that the vehicle has crossed over a lane boundary. However, for certain types of vehicle events, these existing vehicle systems and the corresponding cues they provide to the vehicle operator do not elicit a sufficiently heightened level of situational awareness.

BRIEF SUMMARY OF THE DISCLOSURE

According to various embodiments of the disclosed technology, systems, methods, computer-readable media, techniques, and algorithms for applying directional stimuli to a vehicle operator to enhance the operator's situational awareness are disclosed. In example embodiments, a directional stimulus may be applied from a particular direction that indicates the underlying directionality—with respect to the vehicle operator and the vehicle—of sensed characteristics in the vehicle's external environment that triggered application of the directional stimulus. In this manner, the vehicle operator can identify, with more immediacy, the directionality of a potential safety hazard based on the direction from which the stimulus is applied. Moreover, the stimulus may be applied to a particular part of the vehicle operator's body such as the hackles (back of the neck) to stimulate an immediate instinctual reaction from the vehicle operator, and thus, produce a rapid rise in the operator's situational awareness.

In an example embodiment of the disclosed technology, a vehicle system is disclosed that includes a plurality of output devices adapted to apply a stimulus to a vehicle operator of a vehicle and a vehicle control circuit. In an example embodiment, the vehicle control circuit includes at least one memory storing machine-executable instructions and at least one processor configured to access the at least one memory and execute the machine-executable instructions to perform a set of operations. The set of operations includes determining that detected characteristics of an environment external to the vehicle indicate at least a threshold level of safety risk; determining a directionality of the detected characteristics with respect to the vehicle; selecting, based on the determined directionality, a particular output device of the plurality of output devices to direct the stimulus to the vehicle operator; and causing the stimulus to be directed to the vehicle operator via the selected output device.

In an example embodiment, the set of operations further includes determining that the particular output device is adapted to apply the stimulus to the vehicle operator at substantially a same directionality as the directionality of the detected characteristics with respect to the vehicle.

In an example embodiment, the set of operations further includes receiving sensor data from one or more sensors onboard the vehicle, at least a portion of the sensor data being indicative of the detected characteristics of the environment external to the vehicle; and and the sensor data to determine that the detected characteristics indicate at least the threshold level of safety risk.

In an example embodiment, analyzing the sensor data to determine that the detected characteristics indicate at least the threshold level of safety risk includes determining a safety risk score based on the sensor data; and determining that the safety risk score exceeds a safety risk threshold value.

In an example embodiment, determining the directionality of the detected characteristics with respect to the vehicle includes determining the directionality of the detected characteristics based on a location of at least one sensor of the one or more sensors with respect to a longitudinal axis that coincides with a direction of travel of the vehicle.

In an example embodiment, the sensor data includes one or more of image data, radar data, or light detection and ranging (LiDAR) data.

In an example embodiment, the sensor data further includes data indicative of characteristics of the vehicle.

In an example embodiment, the set of operations further includes receiving sensor data indicative of the detected characteristics from infrastructure present in the environment external to the vehicle.

In an example embodiment, the vehicle system further includes an actuation device for controlling the plurality of output devices to apply to the stimulus.

In an example embodiment, causing the stimulus to be directed to the vehicle operator via the selected output device includes generating a control signal indicative of the stimulus and the selected output device; and sending the control signal to the actuation device to cause the actuation device to apply the stimulus to the vehicle operator via the selected output device.

In an example embodiment, the set of operations further includes determining a safety risk category associated with the detected characteristics; and determining an intensity of the stimulus based on the safety risk category.

In an example embodiment, causing the stimulus to be directed to the vehicle operator via the selected output device includes causing the selected output device to direct the stimulus to the vehicle operator at the determined intensity.

In an example embodiment of the disclosed technology, a method is disclosed that includes sensing characteristics of an environment external to a vehicle; determining that the sensed characteristics indicate at least a threshold level of safety risk; determining a particular part of a body of a vehicle operator of the vehicle that, upon receiving stimuli, produces a heightened awareness for the vehicle operator as compared to one or more other parts of the body of the vehicle operator; selecting, from a plurality of output devices adapted to apply a stimulus to different parts of the body of the vehicle operator, a particular output device adapted to direct the stimulus to a particular part of the body of the vehicle operator; and causing the stimulus to be directed to the particular part of the body of the vehicle operator via the selected output device.

In an example embodiment, the above-described method further includes determining a directionality of the sensed characteristics with respect to the vehicle; and selecting the particular output device further based on the determined directionality.

In an example embodiment, selecting the particular output device further based on the determined directionality includes determining that the particular output device is adapted to apply the stimulus to the particular part of the body of the vehicle operator at substantially a same directionality as the directionality of the sensed characteristics with respect to the vehicle.

In an example embodiment, any of the above-described methods further includes receiving sensor data from one or more sensors onboard the vehicle, at least a portion of the sensor data being indicative of the sensed characteristics of the environment external to the vehicle; and analyzing the sensor data to determine that the sensed characteristics indicate at least the threshold level of safety risk.

In an example embodiment, analyzing the sensor data further includes determining a safety risk score based on the sensor data; and determining that the safety risk score exceeds a safety risk threshold value.

In an example embodiment, determining the directionality of the sensed characteristics with respect to the vehicle includes determining the directionality of the sensed characteristics based on a location of at least one sensor of the one or more sensors with respect to a longitudinal axis that coincides with a direction of travel of the vehicle.

In an example embodiment, the sensor data includes one or more of image data, radar data, or light detection and ranging (LiDAR) data.

In an example embodiment, any of the above-described methods further includes receiving additional sensor data indicative of the sensed characteristics from infrastructure present in the environment external to the vehicle.

In an example embodiment, the particular part of the body of the vehicle operator is a hackles of the vehicle operator, and the stimulus is one of heated or cooled air blown towards the hackles of the vehicle operator or heat applied from a heating element located in proximity to the hackles of the vehicle operator.

In an example embodiment, any of the above-described methods further includes determining a safety risk category associated with the detected characteristics; and determining an intensity of the stimulus based on the safety risk category.

In an example embodiment, causing the stimulus to be directed to the particular part of the body of the vehicle operator via the selected output device includes causing the selected output device to direct the stimulus to the particular part of the body of the vehicle operator at the determined intensity.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
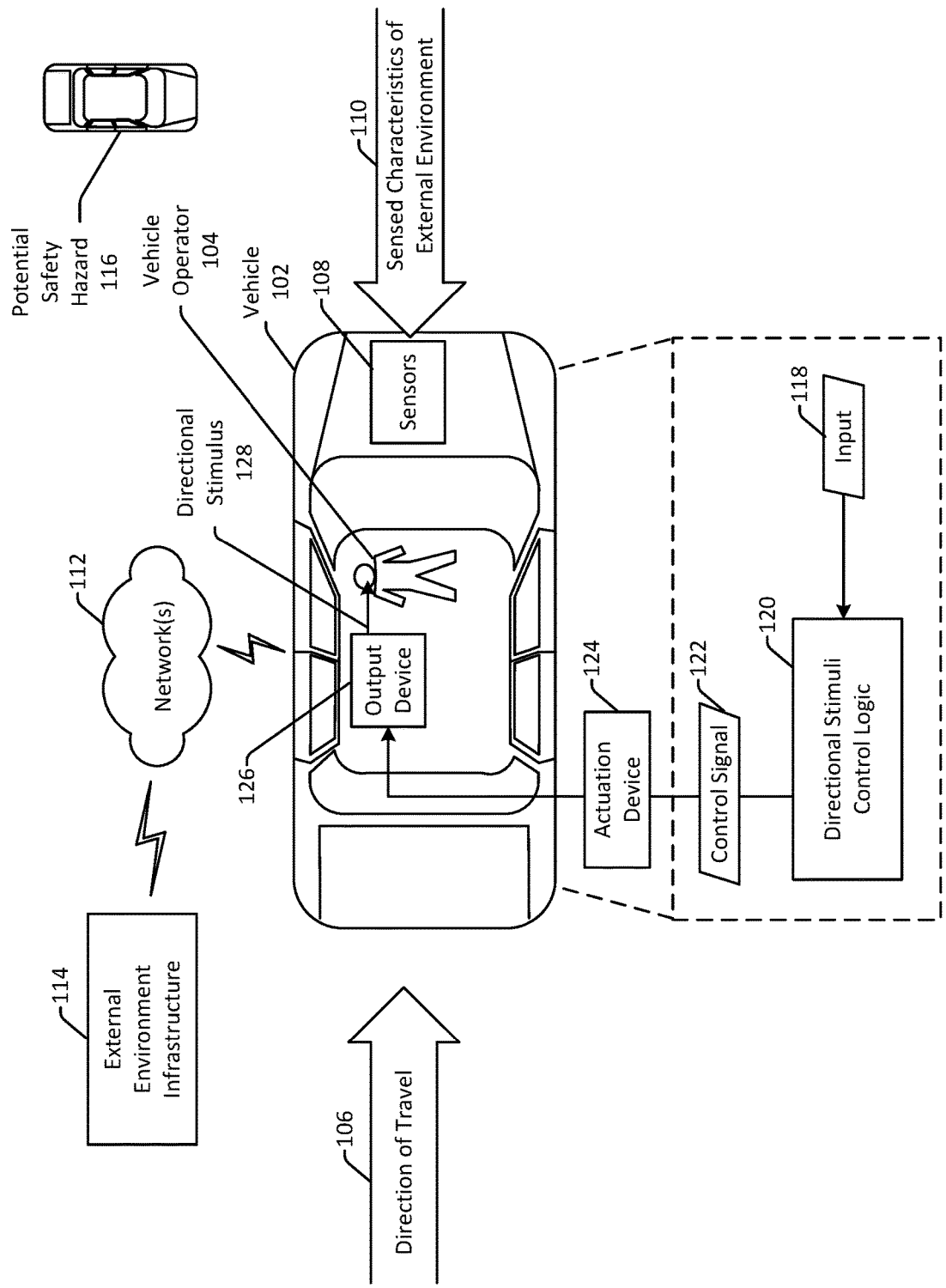
FIG. 1 is a schematic representation of the application of a directional stimulus to a vehicle operator to enhance the operator's situational awareness in accordance with example embodiments of the disclosed technology.

The figures are not exhaustive and do not limit the present disclosure to the precise form disclosed.

DETAILED DESCRIPTION

Example embodiments of the disclosed technology relate to, among other things, systems, methods, computer-readable media, techniques, and algorithms for applying directional stimuli to a vehicle operator to enhance the operator's situational awareness. In example embodiments, a directional stimulus may be applied from a particular direction that is reflective of the underlying directionality—with respect to the vehicle operator and the vehicle—of sensed characteristics in the vehicle's external environment that triggered application of the directional stimulus. In this manner, the vehicle operator can identify, with more immediacy, the directionality of a potential safety hazard based on the direction from which the stimulus is applied.

A variety of different types of directional stimuli may be applied to a vehicle operator in accordance with embodiments of the disclosed technology. For instance, in some example embodiments, the directional stimulus may be air blown from a ventilation system within a vehicle. The ventilation system may include one or more blowers/fans to circulate and/or redirect air through the vehicle and one or more air vents via which the air may be ejected. In some example embodiments, the air may be blown through one or more air vents by one or more standalone blowers/fans that are not connected to the vehicle's ventilation system.

The ejected air may be "hot air" (e.g., above a threshold temperature) or "cold air" (e.g., below a threshold temperature) in order to trigger a more rapid heightening of the vehicle operator's situational awareness. The air may be blown from air vent(s) positioned in front of the vehicle operator (e.g., along a front dashboard), from air vent(s) positioned behind the vehicle operator (e.g., air vent(s) located in a headrest), and/or from air vent(s) positioned laterally (at least partially) with respect to the vehicle operator (e.g., air vent(s) located within a door of the vehicle). As another non-limiting example, the stimulus may be provided by a heating element or a cooling element that is activated to heat or cool a particular portion of the vehicle operator's seat. As yet another non-limiting example, the directional stimulus may be a haptic stimulus such as a vibration of a particular part of the seat occupied by the vehicle operator or a particular part of a steering wheel. The haptic stimulus may be provided, for example, by vibrating a headrest of the seat occupied by the vehicle operator, vibrating a back portion of the seat, vibrating a bottom portion of the seat, or the like.

In example embodiments, the direction from which the stimulus is applied may indicate to the vehicle operator a directionality associated with the event in the external environment that triggered the application of the stimulus. For instance, a directional stimulus in the form of heated or cooled air may be ejected from an air vent located at a left-of-center position on a headrest of the operator's seat (when viewed in a same direction that the vehicle operator is facing). This may result in the heated or cooled air being directed to a portion of the left side of the vehicle operator's body, thereby indicating to the vehicle operator that the event of interest in the external environment is occurring on the left side of the vehicle. Along similar lines, if the heated or cooled air is ejected from an air vent located right-of-center on the headrest, the air may contact a portion of the right side of the vehicle operator's body, thereby indicating to the vehicle operator that the event of interest is occurring on the right side of the vehicle. In some example embodiments, air vent(s) located in front of the vehicle operator may be activated to direct heated or cooled air towards a vehicle operator's face or the front of his body so as to indicate that the event of interest is occurring directly in front of the vehicle. Along similar lines, air vent(s) located directly behind the vehicle operator (e.g., center of the headrest) may be activated to direct heated or cooled air from behind so as to indicate that the event of interest is occurring directly behind the vehicle.

Alternative types of directional stimuli (e.g., haptic stimuli) may similarly be applied from different directions so as to indicate a directionality of the detected events in the external environment in relation the vehicle, and thus, in relation to the vehicle operator. For instance, a portion of the vehicle operator's headrest or a portion of the operator's seat that is left-of-center may be independently vibrated to indicate that the triggering event is occurring on the left side of the vehicle. Conversely, a portion of the vehicle operator's headrest or a portion of the operator's seat that is right-of-center may be independently vibrated to indicate that the triggering event is occurring on the right side of the vehicle. As another non-limiting example, different portions of the vehicle operator's seat can be independently heated and/or cooled to indicate a directionality of the triggering event.

In some example embodiments, the direction from which the stimulus is applied may provide the vehicle operator with a more precise indication of the location of the event of interest in the external environment. For instance, an air vent located left-of-center on the headrest of the vehicle operator's seat may be selected for application of the directional stimulus if the event of interest is located behind and to the left of the vehicle/vehicle operator. Alternatively, if the event of interest is located to the left of but in front of the vehicle/vehicle operator, then an air vent located to the left of the steering wheel on the dashboard, for example, may be selected for applying the directional stimulus. It should be appreciated that the above examples of directional stimuli providing more precise indications of the locations of events of interest in the external environment in relation to the vehicle/vehicle operator are merely illustrative and not exhaustive.

In example embodiments, the directional stimulus may be applied to a particular body part of the vehicle operator. For instance, in some example embodiments, the directional stimulus may applied to the hackles of a vehicle operator in order to trigger an evolutionary "flight or fight" response. The instinctual nature of this response may trigger a more rapid and more intensive enhancement to the vehicle operator's situational awareness. In this manner, the vehicle operator may become aware of a potential safety hazard that triggered the application of the stimulus more quickly than she otherwise would have from conventional visual or auditory safety warnings. The stimulus may be, for example, air blown from a ventilation system such as one or more air vents located in a headrest or back portion of the vehicle operator's seat, which may cause the air to be directed to a back of the vehicle operator's neck (e.g., hackles of the vehicle operator). In some example embodiments, a region in proximity to the hackles of the vehicle operator may be heated or cooled. For instance, a heating or cooling element may be provided in the headrest or back portion of the vehicle operator's seat. The heating or cooling element can be activated to heat or cool a region of the seat near the hackles of the vehicle operator.

In other example embodiments, the directional stimulus may be applied to other areas of the vehicle operator's body also known to trigger an immediate human reaction, and thus, raise the vehicle operator's alertness rapidly. Such areas may include, for example, particular nerve centers of the body, particular body parts, or the like. Thus, in example embodiments, the direction from which a stimulus is applied may reveal, to the vehicle operator, a direction of the potential safety hazard, and the location on the vehicle operator's body where the stimulus is applied may trigger a more rapid enhancement to the situational awareness of the vehicle operator.

In example embodiments, one or more sensors located inside the vehicle or provided on an exterior surface of the vehicle may capture data indicative of sensed characteristics within the environmental external to the vehicle. Such sensors may include, without limitation, light detection and ranging (LiDAR) sensors; radars; image sensors (e.g., cameras); motion sensors; microphones; and so forth. Sensors may also be provided to capture data relating to sensed characteristics within the interior cabin of the vehicle. Such sensors may include, for example, image sensors; microphones; temperature sensors; and so forth. In addition, sensors may be provided to capture data indicative of operational parameters of the vehicle. Such sensors may include, for example, inertial sensors (e.g., inertial measurements units (IMUS), accelerometers, gyroscopes, etc.) configured to capture acceleration, velocity/speed, and orientation data; temperature sensors; vibration sensors; sensors configured to capture data relating to the operation of electrical (e.g., battery) and/or mechanical (e.g., powertrain) components of the vehicle; and so forth. Moreover, in some example embodiments, one or more sensors provided as part of infrastructure within the external environment and/or one or more sensors associated with other vehicles, pedestrians, or the like within the environment may capture and communicate sensor data to the vehicle via one or more wireless communication networks.

In example embodiments, the sensors described above may be configured to continuously monitor and capture data relating to an environment, operational parameter, or the like. In other example embodiments, a sensor may periodically capture data according to a predetermined schedule (e.g., a sampling rate, a scanning rate of a LiDAR, etc.). In example embodiments, the sensor data may include image data of an environment surrounding a vehicle. The image data of the vehicle's external environment may be captured at a selected frame rate by a collection of cameras. The cameras may be disposed such that different cameras capture image data of different portions of the external environment. In example embodiments, the sensor data reflective of sensed characteristics within the vehicle's external environment may further include three-dimensional (3D) point cloud data captured by a LiDAR, radar data, and the like.

In example embodiments, the sensor data may be analyzed to identify various characteristics of the vehicle's external environment and to evaluate a level of safety risk posed by the external environment characteristics. For instance, machine-learning based object perception processing may be executed on image data to identify and classify objects present in the vehicle's external environment. As another non-limiting example, LiDAR and/or radar data may be analyzed to determine relative distances between the vehicle and other objects in the external environment; speed, acceleration, etc. of moving objects in the environment with respect to each other and with respect to the vehicle; and so forth. It should be appreciated that the above-described examples of sensor data that may be captured and analyzed are merely illustrative and not exhaustive.

In example embodiments, after the sensor data is analyzed to identify various characteristics of the vehicle's external environment, these characteristics may be evaluated against various criteria, thresholds, or the like to determine if they represent at least a threshold level of safety risk. For instance, if the analysis of the sensor data reveals that an object (e.g., a vehicle, a bicyclist, a pedestrian, etc.) is travelling at a speed above a threshold speed and/or accelerating above a threshold acceleration along a trajectory that has a likelihood above a threshold probability of intersecting with a current trajectory of the vehicle within a threshold period of time, this scenario may be determined to present greater than a threshold level of risk. Other types of criteria, thresholds, and threshold comparisons are contemplated as well. In addition, an event that triggers application of a directional stimulus to a vehicle operator as described herein (also referred to herein as triggering event, an event of interest, or the like) may refer to any set of characteristics in the external environment that presents at least a threshold level of safety risk. Such an event may refer to a condition relating to an object in the environment (e.g., a pedestrian crossing the road, a vehicle approaching at a high speed along an intersecting road, an obstacle in the middle of the road, etc.) or a condition relating to other aspects of the environment (e.g., a weather condition, a damaged road surface, etc.).

In some example embodiments, sensor data indicative of in-cabin sensed characteristics and/or sensor data indicative of vehicle operational parameters may also be evaluated—in conjunction with the sensor data indicative of sensed characteristics in the external environment—to determine if an event that presents at least a threshold safety risk is occurring in the environment. As an example, side view mirror settings or movement of other passengers in the vehicle may obscure certain views of the external environment, which may cause events (e.g., another vehicle passing on the left or right) that otherwise may not rise to the level of a threshold safety risk to become triggering events for the application of directional stimuli.

As another non-limiting example, route navigation data, Global Positioning System (GPS) data, data from an inertial sensor (e.g., speed, acceleration, and/or orientation data), and the like may be evaluated for the vehicle being operated by the vehicle operator to predict which events that are occurring or expected to occur in the external environment may pose a threshold safety risk within a threshold period of time. For instance, if the vehicle continues to travel along its current trajectory within a certain tolerance of its current speed/acceleration, then the likelihood that a collision occurs with another object (static or moving) in the external environment may be determined to be above a threshold probability, in which case, a threshold safety risk may be determined to exist. In some example embodiments, the intensity of the directional stimulus applied to a vehicle operator may progressively increase as the likelihood of a collision (such as that described above) increases. For instance, if, after application of a directional stimulus to the vehicle operator having a first intensity, both the vehicle and the object with which it may collide continue along their current trajectories unchanged—thereby causing the safety risk to increase—then a second directional stimulus may be directed to the vehicle operator at a second intensity that is greater than the first intensity, in an attempt to elicit a more pronounced increase in the vehicle operator's situational awareness.

Example embodiments of the disclosed technology provide technical solutions to a number of technical problems associated with conventional vehicle safety systems for informing a vehicle operator of a potential safety risk in the vehicle's external environment. While conventional solutions are capable of providing visual and/or audible cues indicative of potential safety hazards in a vehicle's external environment, a directionality of the application of such cues does not reveal anything about the directionality of the potential safety hazard in relation to the vehicle or vehicle operator.

In contrast, example embodiments of the disclosed technology solve this technical problem of conventional solutions by providing directional stimuli to a vehicle operator that reveal—based on the direction from which a stimulus is applied to the vehicle operator and/or the direction from which the stimulus is received by the vehicle operator—a precise direction, in relation to the vehicle/vehicle operator, of the event that triggered the application of the stimulus. For instance, according to example embodiments of the disclosed technology, if heated/cooled air is blown from an air vent located left-of-center on a headrest of the vehicle operator's seat, this indicates to the vehicle operator that the potential safety hazard is not only on the left of the vehicle/vehicle operator, but also at least in part behind the vehicle/vehicle operator. Similarly, if heated/cooled air is blown from an air vent located to the left of the steering wheel on the dashboard, this indicates to the vehicle operator that the potential safety hazard is not only on the left of the vehicle/vehicle operator, but also at least in part in front of the vehicle/vehicle operator.

Thus, example embodiments of the disclosed technology apply directional stimuli to a vehicle operator in a manner that reveals more information to a vehicle operator regarding a potential safety hazard than conventional solutions. As such, embodiments of the disclosed technology offer a technical solution to a technical problem associated with the visual/auditory/haptic cues of conventional solutions—the problem of providing limited information to a vehicle operator as to the directionality of a potential safety hazard in relation to the vehicle/vehicle operator.

In addition, embodiments of the disclosed technology provide an additional technical solution to another technical problem that conventional vehicle safety solutions suffer from. In particular, example embodiments of the disclosed technology apply directional stimuli to particular parts of the human body known to elicit an evolutionary response that generates a more rapid increase in the vehicle operator's level of situational awareness. This constitutes a technical solution and a technical improvement over conventional solutions that provide visual, auditory, and/or haptic cues without regard to which part of the human body may receive the cues, and as a result, elicit a more limited increase in the vehicle operator's situational awareness.

Various technical features and aspects of embodiments of the disclosed technology that yield the above-described technical solutions and their resulting technical benefits will now be described in more detail in reference to the Figures and the illustrative embodiments depicted therein.

FIGS. 1-4 will be described at various times hereinafter in conjunction with one another. Referring first to FIG. 1, a vehicle 102 is depicted. The vehicle 102 may be any suitable type of vehicle including, without limitation, automobiles, trucks, motorcycles, recreational vehicles, or other on- or off-road vehicles. In addition, the vehicle 102 may be any of a variety of vehicles that utilize different technologies and/or fuel sources for generating motive force including, but not limited to, hybrid electric vehicles, gasoline-powered vehicles, diesel-powered vehicles, fuel-cell vehicles, electric vehicles, or the like. In some example embodiments, the vehicle 102 may be an autonomous vehicle capable of fully autonomous operation; a semi-autonomous vehicle capable of performing some but not all vehicle operations autonomously; or the like. In those example embodiments in which the vehicle 102 is a fully autonomous vehicle, while a human driver may not need to be present in the vehicle 102 in order for the vehicle to operate, a safety driver may nonetheless be present to comply with governmental regulations, address safety/liability concerns, and potentially take over control of the vehicle in the event of a vehicle system failure or application of a directional stimulus, as described herein.

As depicted in FIG. 1, the vehicle 102 may be traveling along a direction of travel 106. While traveling along the direction of travel 106, the vehicle 102 may, at times, encounter potential safety hazards 116 in the external environment being traversed by the vehicle 102. The potential safety hazards 116 may include vehicles that are traveling along trajectories that could potentially intersect with a trajectory of the vehicle 102, potentially leading to a collision. The potential safety hazards 116 may further include pedestrians or other objects/obstacles that the vehicle 102 could potentially collide with as it travels along its trajectory. The potential safety hazards 116 may also include infrastructure-related hazards such as potential hazards present in or around the road infrastructure (e.g., potholes, speed bumps, construction equipment, etc.).

A vehicle operator 104 may be present in the vehicle 102. The vehicle operator 104 may be actively controlling operation of the vehicle 102, or in the case of an autonomous vehicle, may not be actively controlling the vehicle 102 but may be capable of taking over manual control in the event of failure of an autonomous vehicle function, presence of a potential safety hazard 116, or the like. There may be occasions when a situational awareness of the vehicle operator 104 is diminished due to fatigue, distraction, or the like. Example embodiments of the disclosed technology provide systems, methods, apparatuses, computer-readable media, techniques, and algorithms for rapidly enhancing the situational awareness of the vehicle operator 104 via the application of a directional stimulus 128 to the vehicle operator 104.

In particular, in example embodiments, directional stimuli control logic 120 may be executed to determine when a potential safety hazard 116 is present that triggers application of a directional stimulus 128 to the vehicle operator 104. An output device 126 (e.g., an air vent, a haptic feedback device, etc.) may be adapted to apply the directional stimulus 128 to the vehicle operator 104. In some example embodiments, an actuation device 124 may itself be actuated by a control signal 122 received responsive to execution of the directional stimuli control logic 120 or may actuate the output device 126 based on the received control signal 122 to cause the directional stimulus 128 to be applied to the vehicle operator 104.

In example embodiments, the directional stimuli control logic 120 may receive input 118 including sensor data captured by one or more sensors 108, and may determine, based on the received input 118, whether the potential safety hazard 116 presents at least a threshold safety risk to the vehicle operator 104. The sensor data may be indicative, at least in part, of sensed characteristics 110 of an external environment in which the vehicle 102 is being operated. Further, in some example embodiments, the sensor data may include data received from infrastructure 114 present in the external environment. Such sensor data may be received over one or more communication networks 112 including, for example, one or more wireless communication networks.

Figure 2:
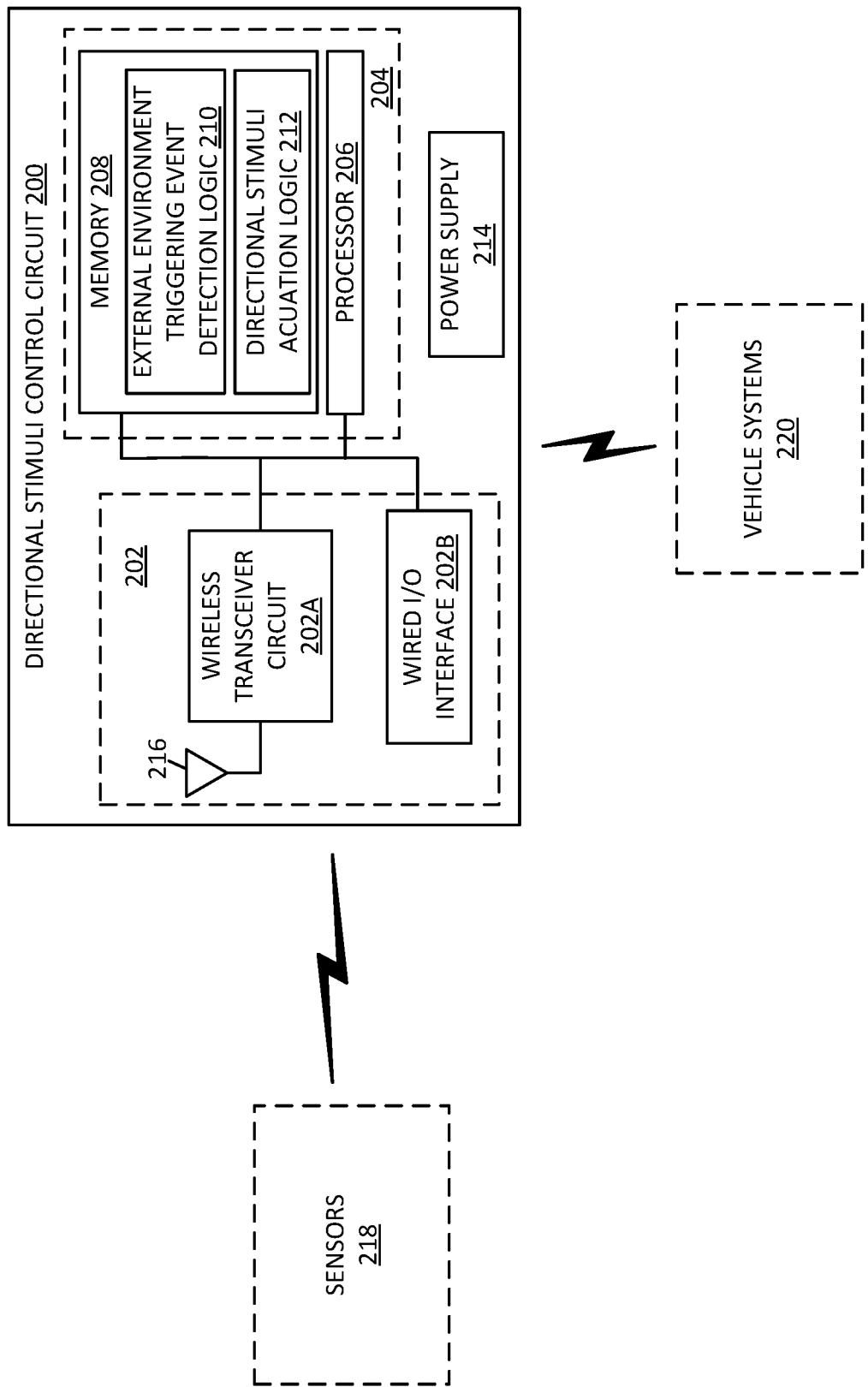
FIG. 2 illustrates an example circuit architecture including example logic for controlling the application of directional stimuli to a vehicle operator to enhance the operator's situational awareness in accordance with example embodiments of the disclosed technology.

In example embodiments, the directional stimuli control logic 120 may be implemented within a vehicle control circuit such as that depicted in FIG. 2. Referring now to FIG. 2, an example implementation of a directional stimuli control circuit 200 is depicted. The control circuit 200 may be, for example, configured to execute machine-executable instructions contained in external environment triggering event detection logic 210 as well as machine-executable instructions contained in directional stimuli actuation logic 212. The control circuit 200 may be provided in the vehicle 102, for example, and can be implemented as part of an electronic control unit (ECU) of the vehicle 102 or as a standalone component. The example control circuit 200 may be implemented in connection with any of the types of vehicles previously described in reference to the vehicle 102.

In example embodiments, execution of the external environment triggering event detection logic 210 may cause the control circuit 200 to gather and assess sensor data to determine whether a potential safety hazard 116 presents at least a threshold safety risk. The sensor data may be indicative of the sensed characteristics 110 in the external environment, indicative of sensed in-vehicle characteristics, and/or indicative of operational parameters of the vehicle 102. In the event that execution of the logic 210 indicates that a threshold safety risk is present, directional stimuli actuation logic 212 may be executed to determine—based on directional data associated with the potential safety hazard 116 that presents the threshold safety risk (e.g., a relative direction/orientation of the potential safety hazard 116 with respect to the vehicle 102)—a type and/or intensity of the directional stimulus 128 to apply to the vehicle operator 104 and an appropriate one or more output devices 126 to actuate to apply the directional stimulus 128. In example embodiments, the output device(s) 126 selected for applying the directional stimulus 128 may be located within the vehicle 102 such that the selected output device(s) 126 are adapted to apply the stimulus 128 from a direction that corresponds to a direction of the potential safety hazard 116 with respect to the vehicle 102. That is, the output device(s) 126 may be selected such that the vehicle operator 104 perceives that the directional stimulus 128 is applied from a direction (e.g., behind and to the left of the vehicle operator 104) that aligns with a direction of the potential safety hazard 116 with respect to the vehicle 102 (e.g., the potential safety hazard 116 is located behind and to the left of the vehicle operator 104).

In some example embodiments, the type of directional stimulus applied may depend on the level of risk posed by the potential safety hazard. That is, as the risk level increases, a type of stimulus that is more likely to elicit a quicker and/or greater enhancement in the vehicle operator's situational awareness may be selected and/or an intensity level of the selected stimulus may be increased. As another non-limiting example, as the risk level from the potential safety hazard 116 rises, an output device 126 that is capable of applying the directional stimulus 128 to a body part of the vehicle operator 104 that is more likely to elicit a more rapid and/or greater rise in the situational awareness of the vehicle operator 104 may be selected (e.g., an output device 126 adapted to direct heated/cooled air to the hackles of the vehicle operator 104).

In the example implementation depicted in FIG. 2, the control circuit 200 includes a communication circuit 202, a decision circuit 204 (including a processor 206 and a memory 208 in this example) and a power supply 214. While components of the control circuit 200 are illustrated as communicating with each other via a data bus, other communication interfaces are also contemplated. Although not depicted in FIG. 2, the control circuit 200 may include a switch (physical or virtual) that allows a user to toggle the functionality of the control circuit 200 disclosed herein on and off.

Processor 206 can include a graphical processing unit (GPU), a central processing unit (CPU), a microprocessor, or any other suitable processing unit or system. The memory 208 may include one or more various forms of memory or data storage (e.g., flash memory, random access memory (RAM), etc.). Memory 208, can be made up of one or more modules of one or more different types of memory, and may be configured to store data and other information as well as operational instructions that may be used by the processor 206 to implement functionality of the control circuit 200. For example, the memory 208 may store the external environment triggering event detection logic 210, which may include computer-executable/machine-executable instructions that, responsive to execution by the processor 206, cause the control circuit 200 to gather and assess sensor data to determine whether a potential safety hazard 116 presents at least a threshold safety risk. The memory 208 may further store the directional stimuli actuation logic 212, which may include computer-executable/machine-executable instructions that, responsive to execution by the processor 206, cause the control circuit 200—in the event that execution of the logic 210 indicates that a threshold safety risk is present—to determine a type and/or intensity of a directional stimulus 128 to apply to the vehicle operator 104 and an appropriate one or more output devices 126 to actuate to apply the directional stimulus 128 based on directional data associated with the potential safety hazard 116 that presents the threshold safety risk (e.g., a relative direction/orientation of the potential safety hazard 116 with respect to the vehicle 102).

The directional stimuli actuation logic 212 may further include computer-executable/machine-executable instructions that, responsive to execution by the processor 206, cause the control circuit 200 to generate and send a control signal 122 to an actuation device 124 to cause the selected output device(s) 126 to apply the directional stimulus 128 to the vehicle operator 104. In some example embodiments, the control signal 122 may actuate the actuation device 124, which in turn, may cause the directional stimulus 128 to be applied via the selected output device(s). For instance, the control signal 122 may be a current or voltage signal that actuates one or more blowers to cause heated/cooled air to be directed to the vehicle operator 104 via selected air vents. Alternatively, in some example embodiments, the actuation device 124 may actuate one or more output devices 126 based on the control signal 122 to cause the directional stimulus 128 to be applied. For instance, a motor may actuate one or more vibrating elements in a headrest, a seat cushion, a steering wheel, or the like to cause vibrational/haptic feedback to be applied to the vehicle operator 104.

Although the example of FIG. 2 is illustrated using processor and memory circuitry, as described below with reference to circuits disclosed herein, decision circuit 204 can be implemented utilizing any form of circuitry including, for example, hardware, software, firmware, or any combination thereof. By way of further example, one or more processors; controllers; application specific integrated circuits (ASICs); programmable logic array (PLAs) devices; programmable array logic (PAL) devices; complex programmable logic devices (CPLDs); field programmable gate arrays (FPGAs); logical components; software routines; or other mechanisms might be implemented to make up the control circuit 200. Similarly, in some example embodiments, the logic 210 and/or the logic 212 can be implemented in any combination of software, hardware, or firmware.

Communication circuit 202 may include a wireless transceiver circuit 202A with an associated antenna 216 and/or a wired input/output (I/O) interface 202B with an associated hardwired data port (not illustrated). As this example illustrates, communications with the control circuit 200 can include wired and/or wireless communications. Wireless transceiver circuit 202A can include a transmitter and a receiver (not shown) to allow wireless communications via any of a number of communication protocols such as, for example, an 802.11 wireless communication protocol (e.g., WiFi), Bluetooth, near field communications (NFC), Zigbee, or any of a number of other wireless communication protocols whether standardized, proprietary, open, point-to-point, networked or otherwise. Antenna 216 is coupled to wireless transceiver circuit 202A and is used by wireless transceiver circuit 202A to transmit radio frequency (RF) signals wirelessly to wireless equipment with which it is connected and to receive radio signals as well. These RF signals can include information of almost any sort that is sent or received by the control circuit 200 to/from other entities such as vehicle sensors 218, other vehicle systems 220, or the like.

A vehicle (e.g., the vehicle 102), such as an autonomous vehicle, can include a plurality of sensors 218 that can be used to detect various conditions internal and/or external to the vehicle and provide sensor data indicative of the sensed characteristics 110 to, for example, the control circuit 200. The sensors 218 may include the sensors 108 and any of the types of sensors described herein. In example embodiments, the sensors 218 may be configured to detect and measure one or more operational parameters of a vehicle such as, for example, fuel efficiency, motor efficiency, hybrid efficiency, acceleration, etc. In some embodiments, one or more of the sensors 218 may include their own processing capability to compute the results for additional information that can be provided to, for example, an ECU and/or the control circuit 200. In other example embodiments, one or more of the sensors 218 may be data-gathering-only sensors that provide only raw data. In further example embodiments, hybrid sensors may be included that provide a combination of raw data and processed data. The sensors 218 may provide an analog output or a digital output.

As previously noted, one or more of the sensors 218 may be able to detect conditions that are external to a vehicle. Sensors that might be used to detect characteristics within an external vehicle environment can include, for example, sonar, radar, LiDAR or other vehicle proximity sensors; cameras or other image sensors; GPS devices; and so forth. Image sensors can be used to capture images of the external environment and object perception processing may be executed on the image data to detect and classify/identify objects present in the external environment. While some sensors can be used to actively detect passive environmental objects (static or dynamic), other sensors can be included and used to detect active objects such as those objects used to implement smart roadways that may actively transmit and/or receive data or other information. Such active objects may constitute at least part of the external environment infrastructure 114.

Referring again to the control circuit 200, wired I/O interface 202B can include a transmitter and a receiver (not shown) for hardwired communications with other devices. For example, wired I/O interface 202B can provide a hardwired interface to other components, including vehicle sensors or other vehicle systems. Wired I/O interface 202B can communicate with other devices using Ethernet or any of a number of other wired communication protocols whether standardized, proprietary, open, point-to-point, networked or otherwise.

Power supply 214 can include one or more batteries of one or more types including, without limitation, Li-ion, Li-Polymer, NiMH, NiCd, NiZn, $NiH_2$, etc. (whether rechargeable or primary batteries); a power connector (e.g., to connect to vehicle supplied power); an energy harvester (e.g., solar cells, a piezoelectric system, etc.); or any other suitable power supply.

It should be appreciated that the logic 210 and/or the logic 212 may be partitioned into two or more engines, program modules, or the like (referred to generically at times hereinafter simply as program module or module). A program module may be a standalone module or a sub-module of another module. Moreover, each module may be implemented in software as computer/machine-executable instructions or code; in firmware; in hardware as hardwired logic within a specialized computing circuit such as an ASIC, FPGA, or the like; or as any combination thereof. It should be understood that any description herein of a module or a circuit performing a particular task or set of tasks encompasses the task(s) being performed responsive to execution of machine-executable instructions of the module and/or execution of hardwired logic of the module.

Example methods according to embodiments of the disclosed technology will now be described in reference to FIGS. 3 and 4, which will be described at times in conjunction with FIGS. 1 and 2. Referring first to the example method 300 of FIG. 3, at block 302 of the method 300, the external environment triggering event detection logic 210 may be executed to detect characteristics (e.g., sensed characteristics 110) in an environment external to a vehicle (e.g., the vehicle 102). In example embodiments, one or more sensors (e.g., sensors 108, sensors 218) located inside the vehicle or provided on an exterior surface of the vehicle may capture data indicative of sensed characteristics within the environmental external to the vehicle. Such sensors may include any of the types of sensors described herein including, without limitation, LiDAR sensors; radars; image sensors (e.g., cameras); motion sensors; microphones; and so forth. In addition, in some example embodiments, the sensor data indicative of the characteristics detected at block 302 may further include data relating to sensed characteristics within the interior cabin of the vehicle; data indicative of operational parameters of the vehicle; data received from sensors present within external environment (e.g., smart sensors located along roadways which may form part of the external environment infrastructure 114); and/or data received from dynamic sensors within the external environment such as sensors associated with pedestrians, vehicles, or other objects within the environment.

In addition, at block 302 (or as part of block 304 of the method 300), the external environment triggering event detection logic 210 may be executed to analyze the sensor data to identify/detect various characteristics of the vehicle's external environment as well as, potentially, to identify/detect in-vehicle characteristics, vehicle operational parameters, or the like. For instance, machine-learning based object perception processing may be executed on image data to identify and classify objects present in the vehicle's external environment. As another non-limiting example, LiDAR and/or radar data may be analyzed to determine relative distances between the vehicle and other objects in the external environment; speed, acceleration, etc. of moving objects in the environment with respect to each other and with respect to the vehicle; and so forth.

At block 304 of the method 300, the external environment triggering event detection logic 210 may be executed to determine a level of safety risk posed by the external environment characteristics. More specifically, in example embodiments, the external environment characteristics may be evaluated against various criteria, thresholds, or the like to determine if they represent at least a threshold level of safety risk. For instance, if the analysis of the sensor data reveals that an object (e.g., a vehicle, a bicyclist, a pedestrian, etc.) is travelling at a speed above a threshold speed and/or accelerating above a threshold acceleration along a trajectory that has a likelihood above a threshold probability of intersecting with a current trajectory of the vehicle within a threshold period of time, this scenario may be determined to present at least a threshold level of risk. As another non-limiting example, if an analysis of the sensor data reveals that a current or predicted trajectory of an object in the vehicle's external environment may intersect with a future planned trajectory of the vehicle with at least a threshold probability, this scenario may also present at least a threshold level of risk. It should be appreciated that various potential safety hazards 116 may evolve from scenarios in which the present a threshold level of risk to scenarios in which they do not based on changes in their trajectories and/or changes in the trajectory of the vehicle.

In some example embodiments, the level of safety risk may be represented as a safety risk score. The safety risk score may be a weighted, linear combination of variables that impact the safety level determination. Such variables may include, for example, a relative distance between a potential safety hazard 116 and the vehicle 102; a relative speed/acceleration of the potential safety hazard 116 in relation to the vehicle; an absolute speed/acceleration of the potential safety hazard 116 and/or the vehicle 102 in relation to common reference frame; a current or predicted future trajectory of the potential safety hazard 116; a current or planned future trajectory of the vehicle 102; weather conditions; road infrastructure conditions; and so forth.

Other types of criteria, thresholds, and threshold comparisons are contemplated for evaluation at block 304 as well. In addition, an event that triggers application of a directional stimulus to a vehicle operator as described herein may refer to any set of characteristics in the external environment that presents at least a threshold level of safety risk. Such an event may refer to a condition relating to an object in the environment (e.g., a pedestrian crossing the road, a vehicle approaching at a high speed along an intersecting road, an obstacle in the middle of the road, etc.) or a condition relating to other aspects of the environment (e.g., a weather condition, a damaged road surface, etc.).

In some example embodiments, sensor data indicative of in-cabin sensed characteristics and/or sensor data indicative of vehicle operational parameters may also be evaluated—in conjunction with the sensor data indicative of sensed characteristics in the external environment—to determine if an event that presents at least a threshold safety risk is occurring in the environment. As an example, side view mirror settings or movement of other passengers in the vehicle may obscure certain views of the external environment, which may cause events (e.g., another vehicle passing on the left or right) that otherwise may not rise to the level of a threshold safety risk to become triggering events for the application of directional stimuli.

As another non-limiting example, route navigation data, GPS data, data from an inertial sensor (e.g., speed, acceleration, and/or orientation data), and the like may be evaluated for the vehicle being operated by the vehicle operator to predict which events that are occurring or expected to occur in the external environment may pose a threshold safety risk within a threshold period of time. For instance, if the vehicle continues to travel along its current trajectory within a certain tolerance of its current speed/acceleration, then the likelihood that a collision occurs with another object (static or moving) in the external environment may be determined to be above a threshold probability, in which case, a threshold safety risk may be determined to exist.

At block 306 of the method 300, machine-executable instructions of the external environment triggering event detection logic 210 may be executed to determine a directionality of the external environment characteristics with respect to the vehicle. More specifically, various sensor data (e.g., image data, LiDAR data, radar data, GPS data, etc.) may be analyzed to determine a relative position of the external environment characteristics with respect to the vehicle 102 (e.g., a relative position of the potential safety hazard 116 that poses at least the threshold safety risk). In some example embodiments, a location of the potential safety hazard 116 within a global coordinate system may be determined and compared to the location of the vehicle within the global coordinate system to determine the relative position of the potential safety hazard 116 with respect to the vehicle 102. This determination may be supplemented by the image data, the radar data, the LiDAR data, or the like. In some example embodiments, a directionality of sounds emitted by the potential safety hazard 116, and thus, a directionality of the hazard 116 with respect to the vehicle, may be determined using sonar data, Doppler effect data, or the like.

At block 308 of the method 300, machine-executable instructions of the directional stimuli actuation logic 212 may be executed to determine a type and/or intensity of a directional stimulus (e.g., the directional stimulus 128) to apply to a vehicle operator (e.g., the vehicle operator 104) and an appropriate one or more output devices (e.g., output devices 126) to actuate to apply the directional stimulus based on directional data indicative of a directionality, with respect to the vehicle, of an event in the external environment (e.g., a potential safety hazard 116) that presents the threshold safety risk.

In example embodiments, the output device(s) selected at block 308 for applying the directional stimulus may be located at positions within the vehicle such that the selected output device(s) are positioned to apply the stimulus from a direction that corresponds to a direction of the potential safety hazard with respect to the vehicle. That is, the output device(s) may be selected such that the vehicle operator perceives that the directional stimulus is applied from a direction (e.g., behind and to the left of the vehicle operator) that aligns with a direction of the potential safety hazard with respect to the vehicle (e.g., the potential safety hazard is located behind and to the left of the vehicle operator 102). For example, a selected output device may be a vibrating element within a steering wheel of the vehicle that causes a top left portion of the steering wheel to independently vibrate (indicating the potential safety hazard is in front of and to the left of the vehicle) or a vibrating element within the steering wheel that causes a bottom right portion of the steering wheel to independently vibrate (indicating the potential safety hazard is behind and to the right of the vehicle).

In some example embodiments, the type of directional stimulus applied may depend on the level of risk posed by the potential safety hazard. That is, as the risk level increases, a type of stimulus that is more likely to elicit a quicker and/or greater enhancement in the vehicle operator's situational awareness may be selected and/or an intensity level of the selected stimulus may be increased. As another non-limiting example, as the risk level from the potential safety hazard rises, an output device that is capable of applying the directional stimulus to a body part of the vehicle operator that is more likely to elicit a more rapid and/or greater rise in the situational awareness of the vehicle operator may be selected (e.g., an output device 126 adapted to direct heated/cooled air to the hackles of the vehicle operator 104.

Figure 3:
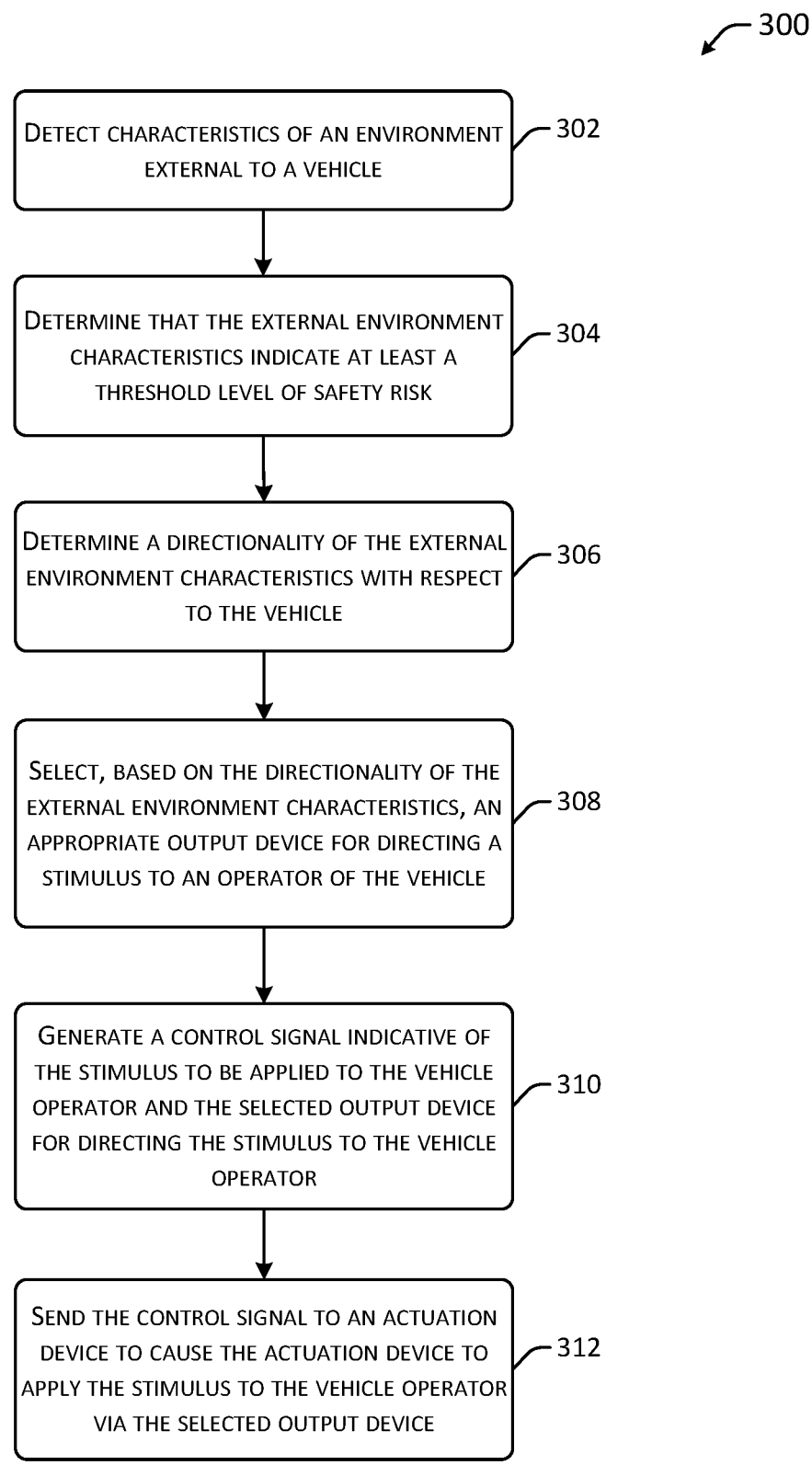
FIG. 3 is a flowchart of an illustrative method for applying a directional stimulus to a vehicle operator to enhance the operator's situational awareness in accordance with example embodiments of the disclosed technology.

Continuing to refer to FIG. 3 in conjunction with the example scenario of FIG. 1, at block 310 of the method 300, machine-executable instructions of the directional stimuli actuation logic 212 may be executed to generate and send a control signal 122 to an actuation device 124 to cause the selected output device(s) 126 to apply the directional stimulus 128 to the vehicle operator 104. The control signal 122 may include an indication of the type of stimulus to apply (and optionally the intensity at which to apply the stimulus 128) as well as an indication of the selected output device(s) 126 to actuate for directing the directional stimulus 128 to the vehicle occupant 104.

At block 312 of the method 300, machine-executable instructions of the directional stimuli actuation logic 212 may be executed to send the control signal 122 to the actuation device 124 to cause the actuation device 124 to apply the stimulus 128 to the vehicle operator 104 via the selected output device(s) 126. In some example embodiments, the control signal 122 may actuate the actuation device 124, which in turn, may cause the directional stimulus 128 to be applied via the selected output device(s) 126. For instance, the control signal 122 may be a current or voltage signal that actuates one or more blowers to cause heated/cooled air to be directed to the vehicle operator 104 via selected air vent(s). Alternatively, in some example embodiments, the actuation device 124 may actuate one or more output devices 126 based on the control signal 122 to cause the directional stimulus 128 to be applied.

Figure 4:
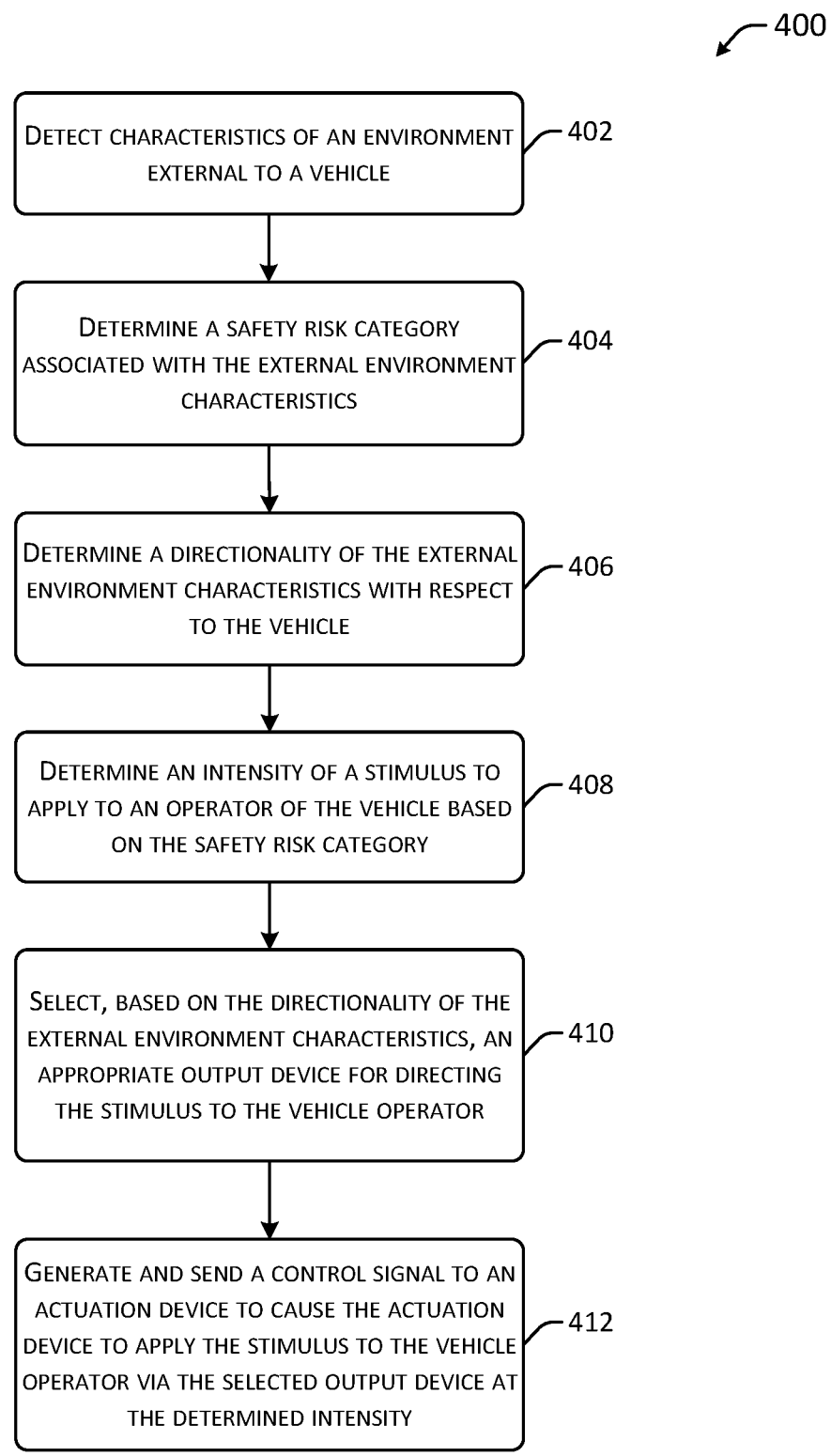
FIG. 4 is a flowchart of an illustrative method for determining an intensity of a directional stimulus and applying the directional stimulus to a vehicle operator at the determined intensity in accordance with example embodiments of the disclosed technology.
Figure 5:
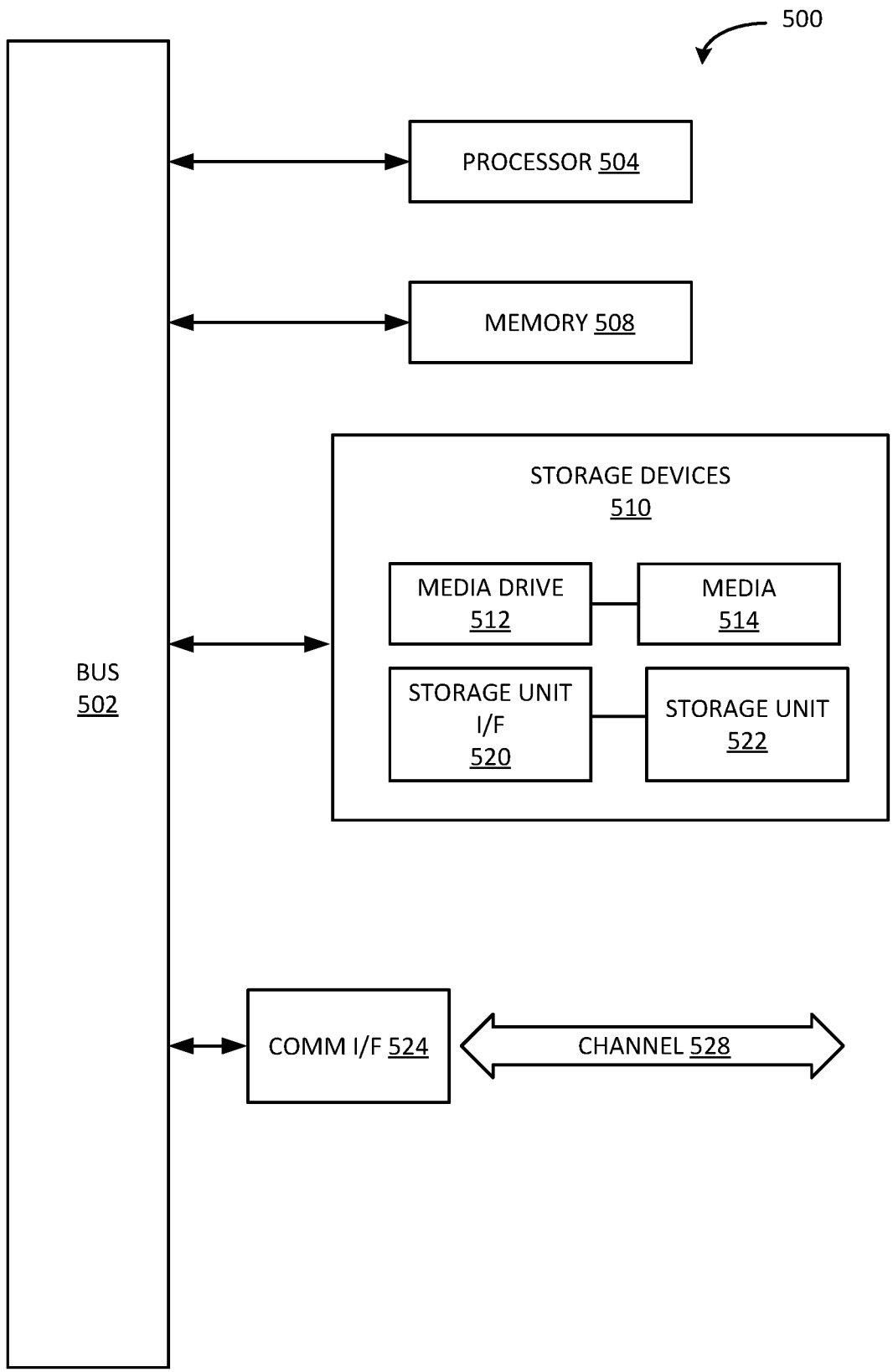
FIG. 5 is an example computing component that may be used to implement various features of embodiments of disclosed technology of the disclosed technology.

FIG. 4 is a flowchart of an illustrative method 400 for determining an intensity of a directional stimuli and applying the directional stimuli to a vehicle operator at the determined intensity in accordance with example embodiments of the disclosed technology. FIG. 4 may be described hereinafter at times in conjunction with FIGS. 1 and 2. Referring now to FIG. 4, at block 402 of the method 400, machine-executable instructions of the external environment triggering event detection logic 210 may be executed to detect characteristics of an environment external to a vehicle (e.g., the vehicle 102). This may include capturing and analyzing sensor data indicative of sensed characteristics 110 of the external environment, sensor data indicative of sensed characteristics of an in-vehicle environment, and/or sensor data indicative of one or more operational parameters of the vehicle 102. The operation(s) performed at block 402 may include any of those previously described in relation to block 302 of the example method 300.

At block 404 of the method 400, machine-executable instructions of the external environment triggering event detection logic 210 may be executed to determine a safety risk category associated with the detected external environment characteristics 110. In particular, as described in reference to example method 300, in some example embodiments, the external environment triggering event detection logic 210 may first analyze sensor data to detect/identify characteristics present in the external environment (e.g., objects, events, road conditions, weather conditions, etc.), and may then compare the identified characteristics and/or sensor data relating thereto to criteria, thresholds, and the like to determine a level of risk associated with the sensed characteristics (e.g., a potential safety hazard 116). Any of the scenarios, criteria, thresholds, or the like described earlier in reference to the example method 300 may be evaluated to determine a level of risk indicated by the sensed characteristics and/or by sensor data reflecting the sensed characteristics.

Upon determining the level of risk, machine-executable instructions of the external environment triggering event detection logic 210 may then be executed to categorize the determined level of risk. For instance, in some example embodiments, each risk category may include a respective range of safety risk levels or safety risk scores. The safety risk category determined at block 404 may be the category that corresponds to a range of risk levels/scores that includes the safety risk level/score associated with the sensed characteristics in the external vehicle environment (e.g., the potential safety hazard 116). In some example embodiments, a machine learning model may be trained to output the safety risk category based on input data including, for example, sensor data indicative of at least sensed characteristics within the external environment; data indicative of safety risk criteria, thresholds, and the like based on which the sensor data is evaluated; and so forth.

At block 406 of the method 400, machine-executable instructions of the external environment triggering event detection logic 210 may be executed to determine a directionality of the detected external environment characteristics with respect to the vehicle. For example, a directionality of the potential safety hazard 116 may be determined with respect to the vehicle 102. The directionality of the potential safety hazard 116 may be determined using any of the techniques described in reference to the example the method 300.

At block 408 of the method 400, machine-executable instructions of the directional stimuli actuation logic 212 may be executed to determine a type and an intensity of a directional stimulus (e.g., the directional stimulus 128) to apply to a vehicle operator (e.g., the vehicle operator 104). In some example embodiments, the type of directional stimulus that is selected may depend on the level of risk posed by the potential safety hazard. That is, as the risk level increases and the corresponding safety risk category into which the risk level is categorized changes, a type of stimulus that is more likely to elicit a quicker and/or greater enhancement in the vehicle operator's situational awareness may be selected.

In addition, as the risk level increases and the corresponding safety risk category changes, the intensity level at which the stimulus is applied may increase as well. For example, in some embodiments, the intensity of the directional stimulus 128 applied to the vehicle operator 104 may progressively increase as the likelihood of a collision increases. For instance, if, after application of the directional stimulus 128 to the vehicle operator 104 at a first intensity, both the vehicle 102 and the object with which it may collide (e.g., the potential safety hazard) continue along their current trajectories unchanged—thereby causing the safety risk to increase—then a second directional stimulus may be directed to the vehicle operator 104 at a second intensity that is greater than the first intensity, in an attempt to elicit a more pronounced increase in the vehicle operator's situational awareness.

At block 410 of the method 400, one or more output devices 126 for applying the directional stimulus 128 may be selected based on the directionality determined at block 406. In example embodiments, the output device(s) 126 selected at block 410 for applying the directional stimulus 128 may be located at positions within the vehicle 102 such that the selected output device(s) 126 are positioned to apply the stimulus 128 from a direction that corresponds to a direction of the potential safety hazard 116 with respect to the vehicle 102. That is, the output device(s) 126 may be selected such that the vehicle operator 104 perceives the directional stimulus 128 as being applied from a direction (e.g., behind and to the left of the vehicle operator 104) that aligns with a direction of the potential safety hazard 116 with respect to the vehicle 102 (e.g., the potential safety hazard 116 is located behind and to the left of the vehicle operator 104). In certain example embodiments, as the risk level from the potential safety hazard 116 rises, an output device 126 that is capable of applying the directional stimulus 128 to a body part of the vehicle operator 104 that is more likely to elicit a more rapid and/or greater rise in the situational awareness of the vehicle operator 104 may be selected at block 410 (e.g., an output device 126 adapted to direct heated/cooled air to the hackles of the vehicle operator 126).

At block 412 of the method 400, machine-executable instructions of the directional stimuli actuation logic 212 may be executed to generate and send a control signal 122 to an actuation device 124 to cause the selected output device(s) 126 to apply the directional stimulus 128 to the vehicle operator 104. The control signal 122 may include an indication of the type of stimulus to apply (and optionally the intensity at which to apply the stimulus) as well as an indication of the selected output device(s) 126 to actuate for directing the directional stimulus 128 to the vehicle occupant 104. As previously described in reference to the example method 300 of FIG. 3, the control signal 122 may actuate the actuation device 124, which in turn, may cause the directional stimulus 128 to be applied via the selected output device(s) 126. Alternatively, in some example embodiments, the actuation device 124 may actuate one or more output devices 126 based on the control signal 122 to cause the directional stimulus 128 to be applied.

As used herein, the terms circuit and component might describe a given unit of functionality that can be performed in accordance with one or more embodiments of the disclosed technology. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 500. After reading this description, it will become apparent to a person skilled in the relevant art how to implement the application using other computing components or architectures.

Referring now to FIG. 6, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor 504, the processor 206 (FIG. 2), or the like. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508, which may, in example embodiments, include the memory 208 (FIG. 2). For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle system, comprising:
   a plurality of output devices adapted to apply a stimulus to a vehicle operator of a vehicle; and
   a vehicle control circuit comprising:
      at least one memory storing machine-executable instructions; and
      at least one processor configured to access the at least one memory and execute the machine-executable instructions to:
         determine that detected characteristics of an environment external to the vehicle indicate level of safety risk;
         determine a directionality of the detected characteristics with respect to the vehicle;
         select, based on the determined directionality, and the level of safety risk a particular output device of the plurality of output devices to direct the stimulus to the vehicle operator, the particular output device equating to a particular stimulus type, wherein the particular stimulus type is different than stimulus types of others of the plurality of output devices; and
         cause the stimulus to be directed to the vehicle operator via the selected output device.

2. The vehicle system of claim 1, wherein the at least one processor is configured to select the particular output device by executing the computer-executable instructions to:
   determine that the particular output device is adapted to apply the stimulus to the vehicle operator at a same directionality as the directionality of the detected characteristics with respect to the vehicle.

3. The vehicle system of claim 1, wherein the at least one processor is further configured to execute the computer-executable instructions to:
   receive sensor data from one or more sensors onboard the vehicle, at least a portion of the sensor data being indicative of the detected characteristics of the environment external to the vehicle; and
   analyze the sensor data to determine that the detected characteristics indicate at least a threshold level of safety risk.

4. The vehicle system of claim 3, wherein the at least one processor is configured to analyze the sensor data to determine that the detected characteristics indicate a level of safety risk by executing the computer-executable instructions to:
   determine a safety risk score based on the sensor data; and
   determine that the safety risk score exceeds a safety risk threshold value.

5. The vehicle system of claim 3, wherein the at least one processor is configured to determine the directionality of the detected characteristics with respect to the vehicle by executing the computer-executable instructions to:
   determine the directionality of the detected characteristics based on a location of at least one sensor of the one or more sensors with respect to a longitudinal axis that coincides with a direction of travel of the vehicle.

6. The vehicle system of claim 3, wherein the sensor data includes one or more of image data, radar data, or light detection and ranging (LiDAR) data.

7. The vehicle system of claim 3, wherein the sensor data further includes data indicative of characteristics of the vehicle.

8. The vehicle system of claim 1, wherein the at least one processor is further configured to execute the computer-executable instructions to:
  receive sensor data indicative of the detected characteristics from infrastructure present in the environment external to the vehicle.

9. The vehicle system of claim 1, further comprising an actuation device for controlling the plurality of output devices to apply to the stimulus, wherein the at least one processor is configured to cause the stimulus to be directed to the vehicle operator via the selected output device by executing the computer-executable instructions to:
  generate a control signal indicative of the stimulus and the selected output device; and
  send the control signal to the actuation device to cause the actuation device to apply the stimulus to the vehicle operator via the selected output device.

10. The vehicle system of claim 1, wherein the at least one processor is further configured to execute the computer-executable instructions to:
  determine a safety risk category associated with the detected characteristics; and
  determine an intensity of the stimulus based on the safety risk category, wherein the at least one processor is configured to cause the stimulus to be directed to the vehicle operator via the selected output device by executing the computer-executable instructions to cause the selected output device to direct the stimulus to the vehicle operator at the determined intensity.

11. A method, comprising:
  sensing characteristics of an environment external to a vehicle;
  determining that the sensed characteristics indicate a level of safety risk;
  determining a particular part of a body of a vehicle operator of the vehicle that, upon receiving stimuli, produces a heightened awareness for the vehicle operator as compared to one or more other parts of the body of the vehicle operator;
  selecting, from a plurality of output devices adapted to apply a stimulus to different parts of the body of the vehicle operator, a particular output device adapted to direct the stimulus to a particular part of the body of the vehicle operator based on the level of safety risk, the particular output device equating to a particular stimulus type, wherein the particular stimulus type is different than stimulus types of others of the plurality of output devices; and
  causing the stimulus to be directed to the particular part of the body of the vehicle operator via the selected output device.

12. The method of claim 11, further comprising:
  determining a directionality of the sensed characteristics with respect to the vehicle; and
  selecting the particular output device further based on the determined directionality.

13. The method of claim 12, wherein selecting the particular output device further based on the determined directionality comprises determining that the particular output device is adapted to apply the stimulus to the particular part of the body of the vehicle operator at a same directionality as the directionality of the sensed characteristics with respect to the vehicle.

14. The method of claim 12, further comprising:
  receiving sensor data from one or more sensors onboard the vehicle, at least a portion of the sensor data being indicative of the sensed characteristics of the environment external to the vehicle; and
  analyzing the sensor data to determine that the sensed characteristics indicate at least a threshold level of safety risk.

15. The method of claim 14, wherein analyzing the sensor data further comprises:
  determining a safety risk score based on the sensor data; and
  determining that the safety risk score exceeds a safety risk threshold value.

16. The method of claim 14, wherein determining the directionality of the sensed characteristics with respect to the vehicle comprises:
  determining the directionality of the sensed characteristics based on a location of at least one sensor of the one or more sensors with respect to a longitudinal axis that coincides with a direction of travel of the vehicle.

17. The method of claim 14, wherein the sensor data includes one or more of image data, radar data, or light detection and ranging (LiDAR) data.

18. The method of claim 14, the method further comprising:
  receiving additional sensor data indicative of the sensed characteristics from infrastructure present in the environment external to the vehicle.

19. The method of claim 11, wherein the particular part of the body of the vehicle operator is a hackles of the vehicle operator, and wherein the stimulus is one of heated or cooled air blown towards the hackles of the vehicle operator or heat applied from a heating element located in proximity to the hackles of the vehicle operator.

20. The method of claim 11, further comprising:
  determining a safety risk category associated with the detected characteristics; and
  determining an intensity of the stimulus based on the safety risk category,
  wherein causing the stimulus to be directed to the particular part of the body of the vehicle operator via the selected output device comprises causing the selected output device to direct the stimulus to the particular part of the body of the vehicle operator at the determined intensity.

* * * * *